United States Patent [19]

Toyono et al.

[11] Patent Number: 4,765,720

[45] Date of Patent: Aug. 23, 1988

[54] METHOD AND APPARATUS FOR DRIVING FERROELECTRIC LIQUID CRYSTAL, OPTICAL MODULATION DEVICE TO ACHIEVE GRADATION

[75] Inventors: Tsutomu Toyono, Yokohama; Shuzo Kaneko, Tokyo, both of Japan

[73] Assignee: Canon Kabushiki Kaisha, Tokyo, Japan

[21] Appl. No.: 76,179

[22] Filed: Jul. 21, 1987

[30] Foreign Application Priority Data

Jul. 22, 1986 [JP] Japan ............................... 61-172584

[51] Int. Cl.[4] ................................................ G02F 1/13

[52] U.S. Cl. ................................ 350/350 S; 350/341; 350/333; 340/765; 340/804

[58] Field of Search .................... 350/333, 341, 350 S; 340/765, 804

[56] References Cited

U.S. PATENT DOCUMENTS

| | | | |
|---|---|---|---|
| 4,508,429 | 4/1985 | Nagae et al. | 350/350 S |
| 4,548,476 | 10/1985 | Kaneko | 350/350 S |
| 4,563,059 | 1/1986 | Clark et al. | 350/350 S |
| 4,655,561 | 4/1987 | Kanbe et al. | 350/350 S |
| 4,709,995 | 12/1987 | Kuribayashi et al. | 350/350 S |
| 4,711,531 | 12/1987 | Masubuchi | 350/350 S |

*Primary Examiner*—Stanley D. Miller
*Assistant Examiner*—Richard F. Gallivan
*Attorney, Agent, or Firm*—Fitzpatrick, Cella, Harper and Scinto

[57] ABSTRACT

An optical modulation device comprises first electrodes and second electrodes disposed opposite to and intersecting with the signal electrodes, and an optical modulation material providing a first and a second orientation state depending on an electric field applied thereto disposed between the first electrodes and the second electrodes, a pixel being formed at each intersection of the first electrodes and the second electrodes so as to form a matrix of pixels as a whole. The optical modulation device is driven by applying an alternating address voltage signal comprising a fore pulse and a rear pulse to an addressed electrode among the first electrodes; and applying, to the second electrodes, a first voltage signal for orienting the pixels on the addressed electrode to the first orientation state in phase with the fore pulse, and a second voltage signal for providing a pixel among the pixels on the addressed electrode with a prescribed areal ratio between the first and second orientation states in the pixel depending on given gradation data; the first and second voltage signals being set to have substantially the same absolute value.

12 Claims, 10 Drawing Sheets

METHOD AND APPARATUS FOR DRIVING FERROELECTRIC LIQUID CRYSTAL, OPTICAL MODULATION DEVICE TO ACHIEVE GRADATION

FIELD OF THE INVENTION AND RELATED ART

The present invention relates to a method and an apparatus for driving an optical modulation device, particularly a ferroelectric liquid crystal device showing at least two stable states.

Hitherto, there is well known a type of liquid crystal device wherein scanning electrodes and signal electrodes are arranged in a matrix, and a liquid crystal compound is filled between the electrodes to form a large number of pixels for displaying images or information. As a method for driving such a display device, a time-division or multiplex driving system wherein an address signal is sequentially and periodically applied to the scanning electrodes selectively while prescribed signals are selectively applied to the signal electrodes in a parallel manner in phase with the address signal, has been adopted.

Most of liquid crystals which have been put into commercial use as such display devices are TN (twisted nematic) type liquid crystals, as described in "Voltage-Dependent Optical Activity of a Twisted nematic Liquid Crystal" by M. Schadt and W. Helfrich, Applied Physics Letters, Vol. 18, No. 4 (Feb. 15, 1971) pp. 127–128.

In recent years, as an improvement on such conventional liquid crystal devices, the use of a liquid crystal device showing bistability has been proposed by Clark and Lagerwall in Japanese Laid-Open Patent Application No. 107216/1981, U.S. Pat. No. 4,367,924, etc. As bistable liquid crystals, ferroelectric liquid crystals showing chiral smectic C phase (SmC*) or H phase (SmH*) are generally used. These liquid crystal materials have bistability, i.e., a property of assuming either a first stable state or a second stable state and retaining the resultant state when the electric field is not applied, and has a high response speed in response to a change in electric field, so that they are expected to be widely used in the field of a high speed and memory type display apparatus, etc.

However, this bistable liquid crystal device may still cause a problem, when the number of pixels is extremely large and a high speed driving is required, as clarified in U.S. Pat. No. 4,655,561. More specifically, if a threshold voltage required for providing a first stable state for a predetermined voltage application time is designated by $-V_{th1}$ and one for providing a second stable state by $V_{th2}$ respectively for a ferroelectric liquid crystal cell having bistability, a display state (e.g., "white") written in a pixel can be inverted to the other display state (e.g., "black") when a voltage is continuously applied to the pixel for a long period of time.

In order to prevent the above mentioned inversion or reversal phenomenon, there has been proposed a method wherein after a writing signal voltage has been applied to a pixel on an addressed electrode line, an alternating voltage below the threshold voltage is applied to the pixel for maintaining the written state as disclosed in U.S. Pat. No. 4,655,561.

On the other hand, there has been also disclosed a method wherein a voltage signal controlling the areal ratio of the first and second orientation states of a ferroelectric liquid crystal occurring in a pixel is applied in order to display a gradation as disclosed in U.S. Pat. No. 4,655,561 and U.S. patent application Ser. Nos. 931,082 and 934,920.

SUMMARY OF THE INVENTION

An object of the present invention is to provide a further improvement in method and apparatus for driving an optical modulation device as described above.

A more specific object of the present invention is to provide a method and apparatus for driving an optical modulation device, particularly suited for providing a gradational display according to multiplexing device.

According to the present invention, there is provided a driving method for an optical modulation device comprising first electrodes and second electrodes disposed opposite to and intersecting with the first electrodes, and an optical modulation material providing a first and a second orientation state depending on an electric field applied thereto disposed between the first electrodes and the second electrodes, a pixel being formed at each intersection of the first electrodes and the second electrodes so as to form a matrix of pixels as a whole; said driving method comprising: applying an alternating address voltage signal comprising a force pulse and a rear pulse to an addressed electrode among the first electrodes; and applying, to the second electrodes, a first voltage signal for orienting the pixels on the addressed electrode to the first orientation state in phase with the fore pulse, and a second voltage signal for providing a pixel among the pixels on the addressed electrode with a prescribed areal ratio between the first and second orientation states in the pixel depending on given gradation data; the first and second voltage signals being set to have substantially the same absolute value.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
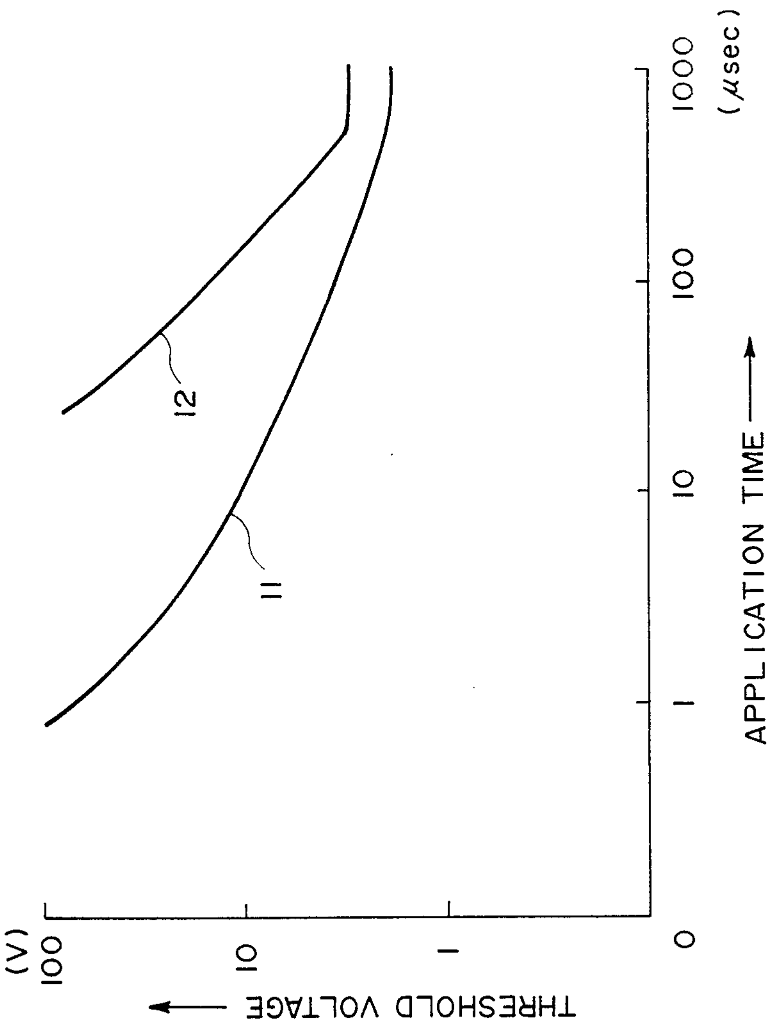
FIG. 1 shows threshold characteristic curves of ferroelectric liquid crystals.

FIG. 1 shows threshold characteristics of a bistable ferroelectric liquid crystal cell. More specifically, FIG. 1 shows the dependency of a threshold voltage ($V_{th}$) required for switching of display states on voltage application time when HOBACPC (showing the characteristic curve 11 in the figure) and DOBAMBC (showing curve 12) are respectively used as a ferroelectric liquid crystal.

As apparent from FIG. 1, the threshold voltage $V_{th}$ has a dependency on the application time, and the dependency is more marked or sharper as the application time becomes shorter. As will be understood from this fact, in case where the ferroelectric liquid crystal cell is applied to a device which comprises numerous scanning lines and is driven at a high speed, there is a possibility that even if a display state (e.g., bright state) has been given to a pixel at the time of scanning thereof, the display state is inverted to the other state (e.g., dark state) before the completion of the scanning of one whole picture area or frame when an information signal below $V_{th}$ is continually applied to the pixel during the scanning of subsequent lines.

As an optical modulation material used in a driving method according to the present invention, a material showing at least two stable states, particularly one showing either a first optically stable state or a second optically stable state depending upon an electric field applied thereto, i.e., bistability with respect to the applied electric field, particularly a liquid crystal having the above-mentioned property, may suitably be used.

Preferable liquid crystals having bistability which can be used in the driving method according to the present invention are chiral smectic liquid crystals having ferroelectricity. Among them, chiral smectic C (SmC*)- or H (SmH*)-phase liquid crystals are suitable therefor. These ferroelectric liquid crystals are described in, e.g., "LE JOURNAL DE PHYSIQUE LETTRES", 36 (L-69), 1975 "Ferroelectric Liquid Crystals"; "Applied Physics Letters" 36 (11) 1980, "Submicro Second Bistable Electrooptic Switching in Liquid Crystals"; "Kotai Butsuri (Solid State Physics)" 16 (141), 1981 "Liquid Crystal", U.S. Pat. Nos. 4,561,726, 4,589,996, 4,592,858, 4,596,667, 4,613,209, 4,614,609 and 4,622,165, etc. Ferroelectric liquid crystals disclosed in these publications may be used in the present invention.

More particularly, examples of ferroelectric liquid crystal compound used in the method according to the present invention include decyloxybenzylidene-p'-amino-2-methylbutylcinnamate (DOBAMBC), hexyloxybenzylidene-p'-amino-2-chloropropylcinnamate (HOBACPC), 4-O-(2-methyl)-butylresorcylidene-4'-octylaniline (MBRA8), etc.

When a device is constituted by using these materials, the device can be supported with a block of copper, etc., in which a heater is embedded in order to realize a temperature condition where the liquid crystal compounds assume an SmC*- or SmH*-phase.

Further, a ferroelectric liquid crystal formed in chiral smectic F phase, I phase, J phase, G phase or K phase may also be used in addition to those in SmC* or SmH* phase in the present invention.

Figure 2:
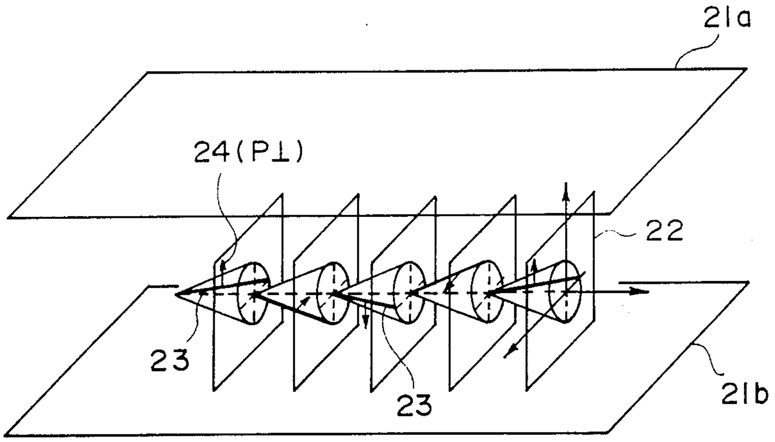
FIGS. 2 and 3 are schematic perspective views for illustrating the operation principles of a ferroelectric liquid crystal device used in the present invention.
Figure 3:
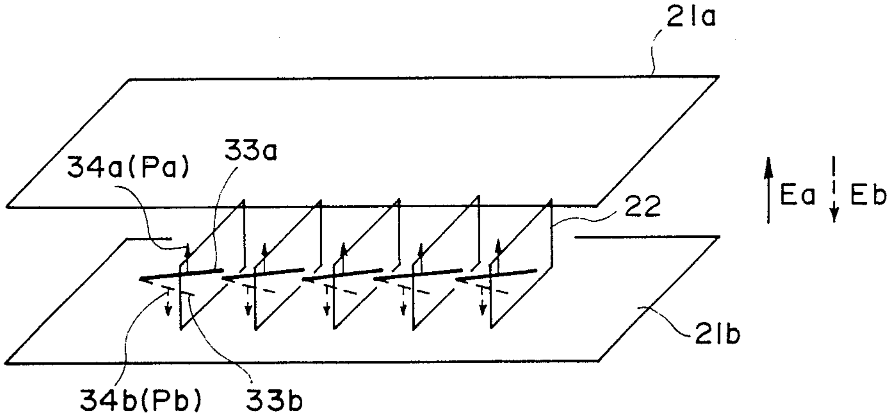

Referring to FIG. 2, there is schematically shown an example of a ferroelectric liquid crystal cell. Reference numerals 21*a* and 21*b* denote substrates (glass plates) on which a transparent electrode of, e.g., $In_2O_3$, $SnO_2$, ITO (Indium Tin Oxide), etc., is disposed, respectively. A liquid crystal of an SmC*-phase in which liquid crystal molecular layers 22 are oriented perpendicular to surfaces of the glass plates is hermetically disposed therebetween. A full line 23 shows liquid crystal molecules. Each liquid crystal molecule 23 has a dipole moment ($P_\perp$) 24 in a direction perpendicular to the axis thereof. When a voltage higher than a certain threshold level is applied between electrodes formed on the substances 21*a* and 21*b*, a helical structure of the liquid crystal molecule 23 is unwound or released to change the alignment direction of respective liquid crystal molecules 23 so that the dipole moments ($P_\perp$) 24 are all directed in the direction of the electric field. The liquid crystal molecules 23 have an elongated shape and show refractive anisotropy between the long axis and the short axis thereof. Accordingly, it is easily understood that when, for instance, polarizers arranged in a cross nicol relationship, i.e., with their polarizing directions being crossing each other, are disposed on the upper and the lower surfaces of the glass plates, the liquid crystal cell thus arranged functions as a liquid crystal optical modulation device of which optical characteristics such as contrast vary depending upon the polarity of an applied voltage. Further, when the thickness of the liquid crystal cell is sufficiently thin (e.g., 1μ), the helical structure of the liquid crystal molecules is unwound without application of an electric field whereby the dipole moment assumes either of the two states, i.e., Pa in an upper direction 34*a* or Pb in a lower direction 34*b* as shown in FIG. 3. When electric field Ea or Eb higher than a certain threshold level and different from each other in polarity as shown in FIG. 3 is applied to a cell having the above-mentioned characteristics, the dipole moment is directed either in the upper direction 34*a* or in the lower direction 34*b* depending on the vector of the electric field Ea or Eb. In correspondence with this, the liquid crystal molecules are oriented to either of a first stable state 33*a* and a second stable state 33*b*.

When the above-mentioned ferroelectric liquid crystal is used as an optical modulation device, it is possible to obtain two advantages. First is that the response speed is quite fast. Second is that the orientation of the liquid crystal shows bistability. The second advantage will be further explained, e.g., with reference to FIG. 3. When the electric field Ea is applied to the liquid crystal molecules, they are oriented to the first stable state 33*a*. This state is stably retained even if the electric field is removed. On the other hand, when the electric field Eb of which direction is opposite to that of the electric field Ea is applied thereto, the liquid crystal molecules are oriented to the second stable state 33*b*, whereby the directions of molecules are changed. Likewise, the latter state is stably retained even if the electric field is removed. Further, as long as the magnitude of the electric field Ea or Eb being applied is not above a certain threshold value, the liquid crystal molecules are placed in the respective orientation states. In order to effectively realize high response speed and bistability, it is preferable that the thickness of the cell is as thin as possible and generally 0.5 to 20 μ, particularly 1 to 5 μ.

A preferred embodiment of the driving method according to the present invention will now be explained with reference to FIGS. 4 et seq.

Figure 4:
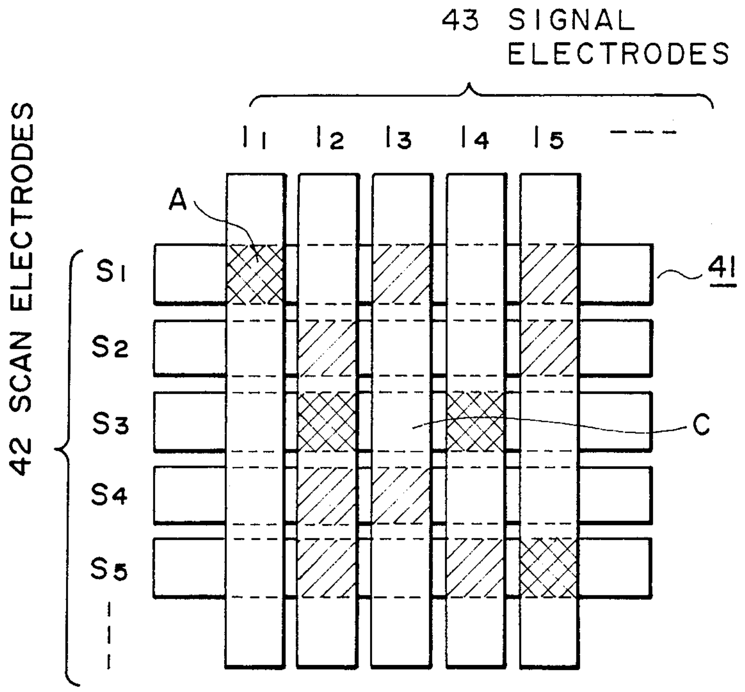
FIG. 4 is a plan view of a matrix pixel arrangement used in the present invention.

Referring to FIG. 4, there is schematically shown a representative cell 41 having a matrix pixel arrangement in which a ferroelectric liquid crystal (not shown) is interposed between scanning electrodes 42 and signal electrodes 43. The present invention is applicable to a multi-level or analog gradational display, but for brevity of explanation, a case wherein three levels of "white", one intermediate level and "black" are displayed will be explained. In FIG. 4, the crosshatched pixels are assumed to be displayed in "black"; the unidirectionally hatched pixels, in the intermediate level; and the other pixels; in "white".

Figure 5:
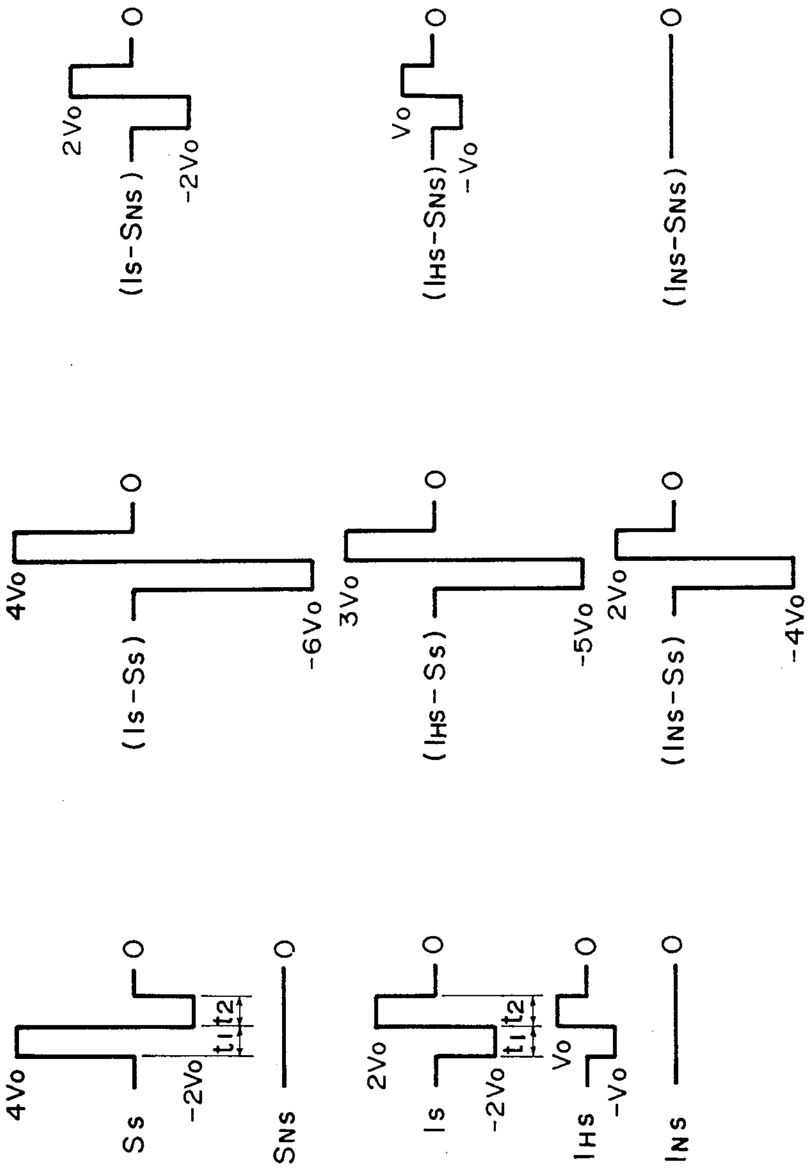
FIG. 5 shows signal waveforms used in the driving method of the present invention.

FIG. 5 illustrates an exemplary set of driving signal waveforms whereby the pixels are subjected to image-erasure and writing line by line. The pixels of picture after the writing corresponds to that shown in FIG. 4.

More specifically, FIG. 5 shows voltage signal waveforms applied to the respective scanning electrodes $S_S$, $S_{NS}$ and the respective signal electrodes $I_S$, $I_{HS}$, $I_{NS}$ and voltages applied to the liquid crystal at the pixels formed at the intersections of the scanning electrodes and signal electrodes. Herein, the abscissa represents time and the ordinate represents potential level or voltage.

Referring to FIG. 5, at $S_S$ is shown a voltage signal for addressing an electrode, i.e., a driving waveform applied to a line on which image data are written (i.e., a selected or addressed scanning electrode), and at $S_{NS}$ is shown a driving waveform applied at that time to a line on which image data are not written (i.e., a now-selected or non-addressed scanning electrode). On the other hand, at $I_S$ is shown a driving signal waveform for writing "black" at an intersection (pixel) with the selected line, at $I_{HS}$ is shown a driving signal waveform for writing the intermediate level, and at $I_N$ is shown a driving signal waveform for writing "white".

At this time, the liquid crystal at the respective pixels is supplied with voltages shown at $I_S$–$S_S$, $I_{HS}$–$S_S$, $I_{NS}$–$S_S$, $I_S$–$S_{NS}$, $I_{HS}$–$S_{NS}$, and $I_{NS}$–$S_{NS}$, respectively.

Herein, the driving voltage $V_0$ is so selected as to satisfy a relation of, e.g., $|\pm 2\ V_0| < |V_{th}| < |\pm 3\ V_0|$ in connection with the inversion threshold voltage $V_{th}$ of a bistable ferroelectric liquid crystal used. Depending on the kind and condition of an aligning treatment, etc., applied to the cell, the threshold voltage $V_{th}$ can be slightly different between its ⊕ side and ⊖ side in some cases. In such a case, the respective driving waveforms may be somewhat changed, e.g., by biasing the base potential level to some extent. For brevity of explanation, however, it is assumed that the threshold voltage is the same on the positive polarity and negative polarity sides.

When the voltage $V_0$ is set in the above described manner, if a voltage having its absolute value of below 2 $V_0$ is applied to the liquid crystal at a pixel, no inversion between liquid crystal molecular orientations occur but if the absolute value exceeds 2 $V_0$, the inversion occurs with its degree being intensified as the absolute value increases.

Now, the respective waveforms are explained more specifically with reference to FIG. 5.

So as to effect one line of writing in a period divided into two phases $t_1$ and $t_2$, a selected scanning electrode $S_S$ is supplied with a voltage of 4 $V_0$ at the first phase $t_1$ in order to effect erasure of a line, and a voltage of $-2$ $V_0$ at the second phase $t_2$ in order to write in pixels depending on signals applied to the signal electrodes.

On the other hand, each nonselected scanning electrode $S_{NS}$ is fixed at the base potential (0 volt in this embodiment) at both the first and second phases $t_1$ and $t_2$.

Then, with respect to the voltage signal (or potential) waveforms applied to the signal electrodes in substantial synchronism with the phases of the signals applied to the selected scanning electrode, a voltage of 0 to $-2$ $V_0$ corresponding to given gradation data is applied at the first phase $t_1$. More specifically, in case of writing "black" ($I_S$), $-2$ $V_0$ is applied; while, 0 volt ($I_{NS}$) for writing "white" and an intermediate voltage ($-V_0$ ($I_{HS}$) in this embodiment) for writing an intermediate gradation (half tone) are applied. As a result, at this phase, voltages in the range of $-4$ $V_0$ to $-6$ $V_0$ are applied between the selected scanning electrode and the respective signal electrodes. These voltages all exceed the inversion threshold voltage $-V_{th}$, so that all the pixels on the line are all inverted to the erasure (white) side. Then, at the second phase, the signal electrodes intersecting with the selected scanning electrode $S_S$ are respectively supplied with a voltage of 0 to 2 $V_0$, with the opposite polarity to that of the voltage applied at the first phase, corresponding to given gradation data. Herein, the potential (voltage signal) for writing "black" in a pixel is assumed to be $+2$ $V_0$; the potential for writing "gray" (intermediate level), $+V_0$, for example; and the potential for retaining "white", zero (base potential). As a result, at this phase, the pixels on the line are supplied with voltages of $+4$ $V_0$, $+3$ $V_0$ and $+2$ $V_0$ and are written in "black", the intermediate level and "white", respectively.

On the other hand, the voltages applied between the nonselected scanning electrode $S_{NS}$ and the respective signal electrodes $I_S$, $I_{HS}$ and $I_{NS}$ are those as shown in FIG. 5.

Figure 6:
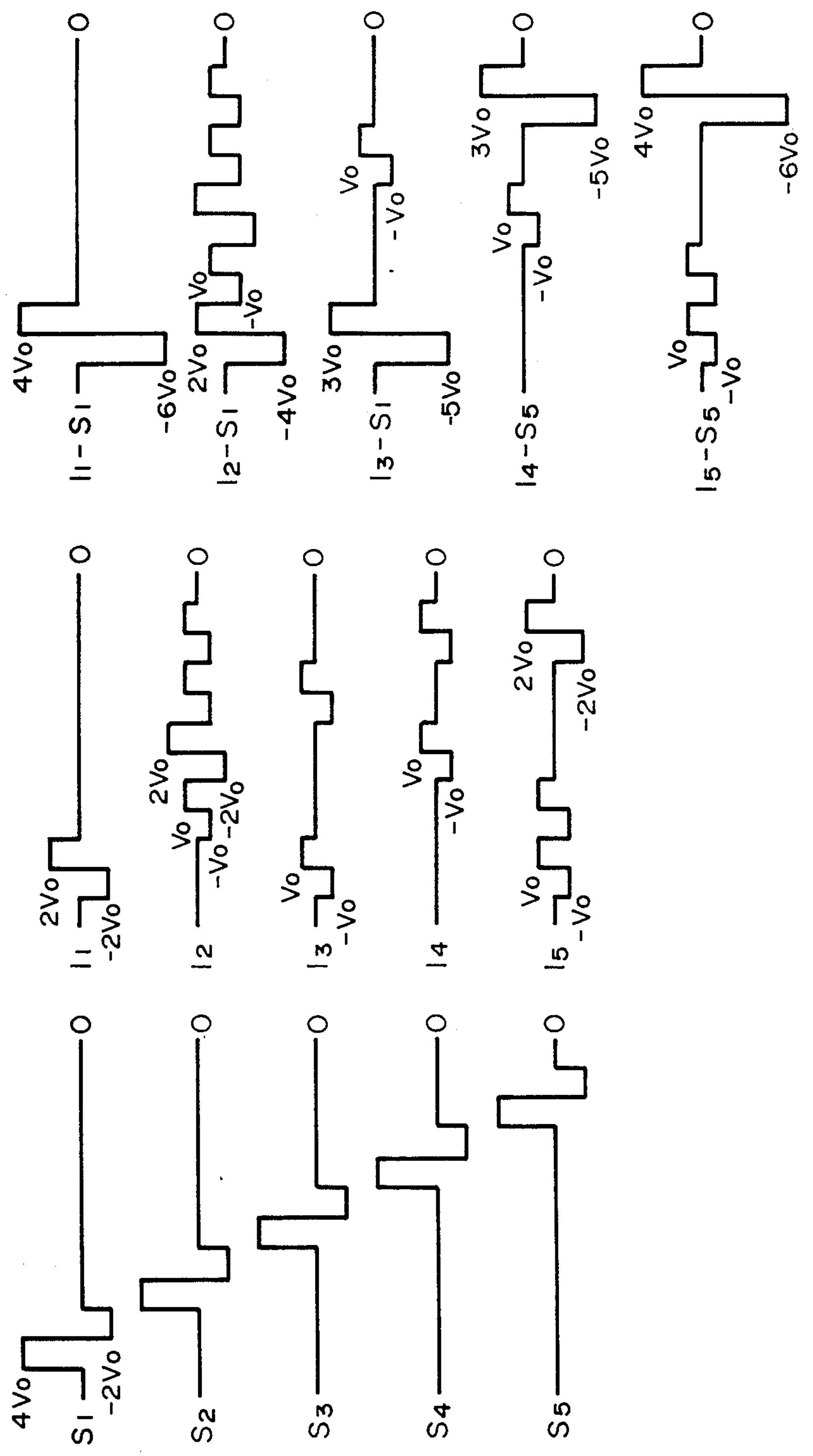
FIG. 6 shows time-serially applied signal waveforms for writing the picture shown in FIG. 4 by using the signals shown in FIG. 5.

FIG. 6 shows a time chart wherein the waveforms shown in FIG. 5 are sequentially applied to the scanning electrodes and signal electrodes. In FIG. 6, examples of voltage waveforms time-serially applied to pixels are also shown with respect to the pixels (intersections) of $I_1$–$S_1$, $I_2$–$S_1$, $I_3$–$S_1$, $I_4$–$S_5$, and $I_5$–$S_5$. As a result of one frame operation using the waveforms shown in FIG. 6, a picture shown in FIG. 4 is written.

Now, the significance of the driving method according to the present invention will now be explained in some detail. Microscopic mechanism of switching due to electric field of a ferroelectric liquid crystal under bistability condition has not been fully clarified. Generally speaking, however, the ferroelectric liquid crystal can retain its stable state semi-permanently, if it has been switched or oriented to the stable state by application of a strong electric field for a predetermined time and is left standing under absolutely no electric field. However, when a reverse polarity of an electric field is applied to the liquid crystal for a long period of time, even if the electric field is such a weak field (corresponding to a voltage below $V_{th}$ in the previous example) that the stable state of the liquid crystal is not switched in a predetermined time for writing, the liquid crystal can change its stable state to the other one, whereby correct display or modulation of information cannot be accomplished. We have recognized that the liability of such switching or reversal of oriented states under a long term application of a weak electric field is affected by a material and roughness of a substrate contacting the liquid crystal and the kind of the liquid crystal, but have not clarified the effects quantitatively. We have confirmed a tendency that a uniaxial treatment of the substrate such as rubbing or oblique or tilt vapor deposition of SiO, etc., increases the liability of the above-mentioned reversal of oriented states. The tendency is manifested at a higher temperature compared to a lower temperature.

Anyway, in order to accomplish correct display or modulation of information, it is advisable that one direction of electric field is prevented from being applied to the liquid crystal for a long time.

In the present invention, the above problem has been dissolved by preventing a voltage of one polarity from being continually applied.

More specifically, with respect to the voltage waveforms shown at $I_S$-$S_{NS}$, $I_{HS}$-$S_{NS}$ and $I_{NS}$-$S_{NS}$ in FIGS. 5 and 6 applied to the pixels during the period of non-selection, the voltages applied at the first and second phases have almost the same absolute value and opposite polarities. As a result, even if the number of matrix electrodes are increased, the voltage applied to a pixel is not biased to one polarity. In the embodiment shown in FIG. 5, the voltage level applied to a scanning electrode during the period of non-selection is made 0 (zero), so that the voltage level applied to a signal electrode is almost the same as the voltage applied to a corresponding pixel.

Further, with respect to the voltage waveforms applied to the pixels on a selected scanning electrode as shown at $I_S$-$S_S$, $I_{HS}$-$S_{NS}$ and $I_{NS}$-$S_{NS}$, the complete inversion voltage for erasure of a pixel at the first phase is added to a voltage which is almost the same in magnitude as but has the opposite polarity to that of a gradation signal voltage corresponding to given gradation display data for each pixel. In the subsequent second phase, the pixels on the selected scanning electrode are supplied with a voltage obtained by superposing an inversion initiation voltage (as shown at point 102 in FIG. 10) with a gradation signal voltage as described above corresponding to given gradation display data for each pixel. As a result, as shown in FIG. 5, a ⊖ polarity voltage for pixel erasure is applied and then a ⊕ polarity voltage for determining a pixel density is applied, so that a single polarity is not applied continually. Further, even in a case where a scanning electrode and a signal electrode are selected, the voltage applied to a pixel at the second phase for writing has a polarity opposite to that of the voltage applied to the pixel placed on a non-selected scanning electrode at the subsequent first phase. As a result, in any case, one polarity of voltage is not continually applied, whereby good and stable gradation display may be effected without causing cross-talk. Further, a pixel is written in two phases, whereby a very high speed display becomes possible.

Needless to say, a binary display can of course be effected by selecting only two values corresponding to "white" and "black".

In the above driving embodiment, the gradation signals are given by voltage modulation. Alternatively, it is also possible to provide gradation signals as voltage pulse signals applied to signal electrodes having almost equal number of voltage pulses but with mutually opposite polarities at the first and second phases while controlling or modulating the number of pulses. Likewise, it is also possible to provide pulse duration-modified gradation signals.

A gradational display of more levels will now be explained with reference to FIGS. 7, et. seq. by way of a modification to the above embodiment.

Figure 7A:
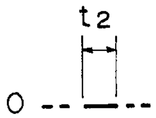
FIGS. 7A–7E show signal waveforms corresponding to given gradation data.
Figure 9A:
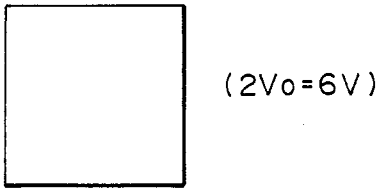
FIGS. 9A–9E illustrate orientation states of a cell corresponding to gradation data.

FIGS. 7A–7E show gradation voltage signals applied to data signal electrodes applied at the second phase $t_2$, and FIGS. 8A–8E show voltages applied to pixels on a selected scanning electrode and supplied with the above gradation signal voltages from the signal electrodes. FIG. 7A shows a voltage waveform of a first gradation signal (0 volt) by which a voltage of 2 $V_0$ is applied to the corresponding pixel. The voltage 2 $V_0$ is just below the inversion initiation voltage (102 in FIG. 10), so that the whole pixel retains the "white" state written at the first phase as shown in FIG. 9A.

Figure 7B:
Figure 7C:
Figure 7D:
Figure 7E:
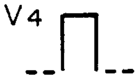
Figure 8A:
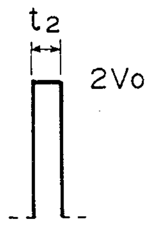
FIGS. 8A–8E show gradation data voltage waveforms applied to the pixels.
Figure 8B:
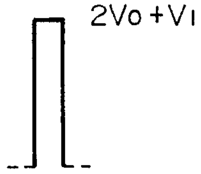
Figure 8C:
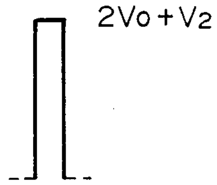
Figure 8D:
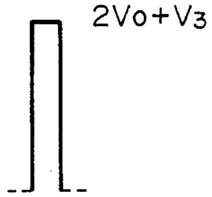
Figure 8E:
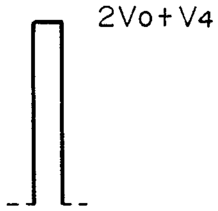
Figure 9B:
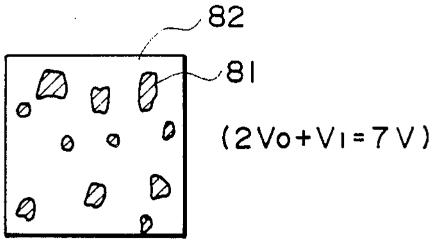
Figure 9C:
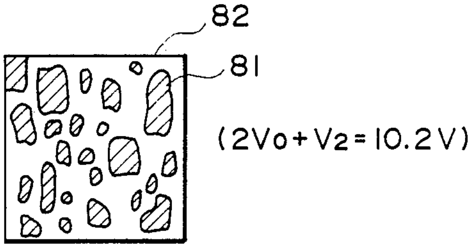
Figure 9D:
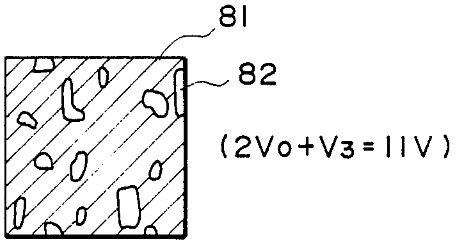
Figure 9E:
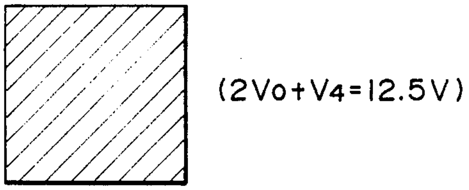

FIG. 7E shows a voltage waveform of a fifth gradation signal ($V_4$) by which a complete inversion voltage of (2 $V_0+V_4$, 101 in FIG. 10) is applied to the corresponding pixel, which is thereby inverted from white to black over the entire pixel region as shown in FIG. 9E.

FIGS. 7B, 7C and 7D show voltage waveforms of a second gradation signal ($V_1$), a third gradation signal ($V_2$) and a fourth gradation signal ($V_3$), respectively, and the respective gradation signal levels are set to satisfy the relations of $0<|V_1|<|V_2|<|V_3|<|V_4|$. As a result, intermediate voltages of 2 $V_0+V_1$, 2 $V_0+V_2$ and 2 $V_0+V_3$, which are all above the inversion initiation voltage of just exceeding 2 $V_0$ and below the complete inversion voltage of 2 $V_0+V_4$, are applied to the corresponding pixels. As a result of application of these intermediate voltages, these pixels are caused to have varying ratios of the converted black region 81 to the unconverted white region 82 controlled depending on the magnitude of the intermediate voltages. Thus, FIG. 9B shows the state of a pixel to which a voltage of (2 $V_0+V_1$) has been applied; FIG. 9C shows a pixel to which a voltage of (2 $V_0+V_2$) has been applied; and FIG. 9D shows a pixel to which a voltage of (2 $V_0+V_3$) has been applied. Incidentally, FIGS. 9A–9E are sketches of pixel states observed through a polarizing microscope using cross nicol polarizers arranged at 90°.

In the white region 81, ferroelectric liquid crystal molecules are oriented to the first orientation state, and in the black region 81, ferroelectric liquid crystal molecules are oriented to the second orientation state. These orientation states may be changed in the subsequent frame operation based on writing image data but are retained until a cleaning or erasure signal ($-4$ $V_0$ to $-6$ $V_0$) exceeding the complete inversion voltage is applied thereto, whereby a gradational display is effected for a period of one frame.

Figure 10:
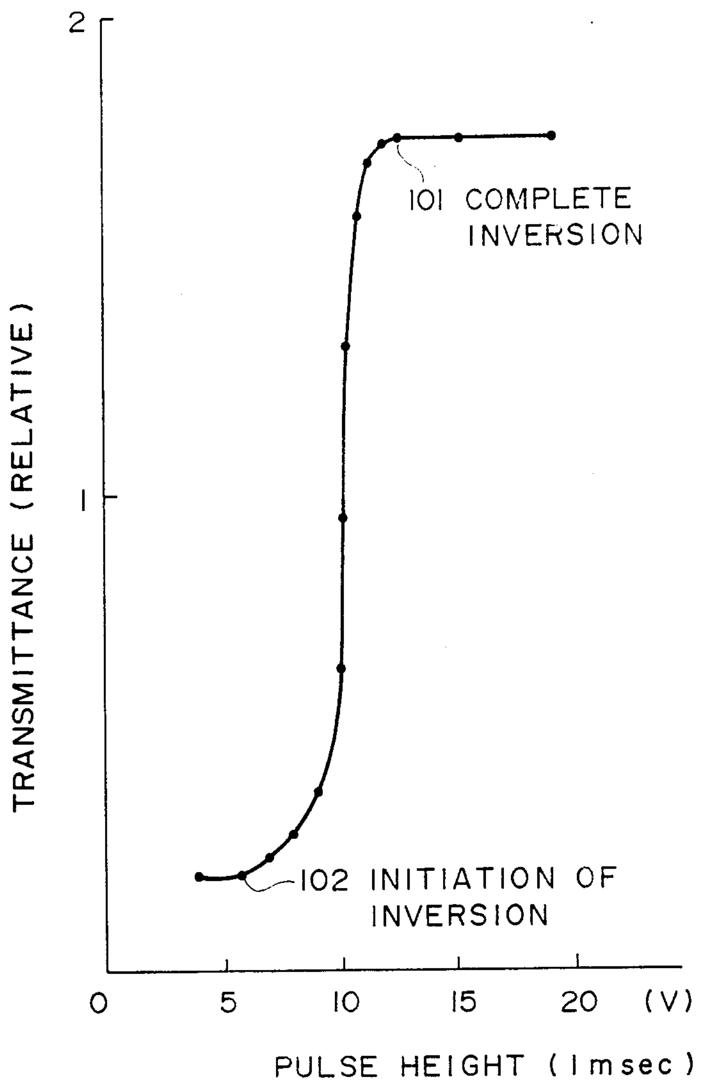
FIG. 10 is a graph showing a relation between a pulse height and a resultant light transmittance of a pixel.

FIG. 10 shows a relationship of light transmittance versus voltage for a ferroelectric liquid crystal cell. The ferroelectric liquid crystal cell was obtained by fixing a pair of glass substrates each provided with an ITO film covered with a 1000 Å-thick rubbed polyimide film to each other with a gap of 1.8 μm to form a cell, into which a ferroelectric liquid crystal composition (CS-1011, available from Chisso K.K.) was injected. The voltages and transmittances were measured with reset to the cell at 38° C. by the application of voltages with various voltage levels indicated by in FIG. 10, and a pulse duration of 1 msec.

As shown in FIG. 10, the ferroelectric liquid crystal cell showed an inversion initiation voltage ($\approx$2 $V_0$) as shown at 102 of 6 volts, and a complete inversion voltage (2 $V_0+V_4$) as shown at 101 of 12.5 volts. At intermediate voltage (2 $V_0+V_1$) of 7 volts provided a pixel state as shown in FIG. 9B; an intermediate voltage (2 $V_0+V_2$) of 10.2 volts provided a pixel state as shown in FIG. 9C; and an intermediate voltage (2 $V_0+V_3$) of 11 volts provided a pixel state as shown in FIG. 19D.

Figure 11:
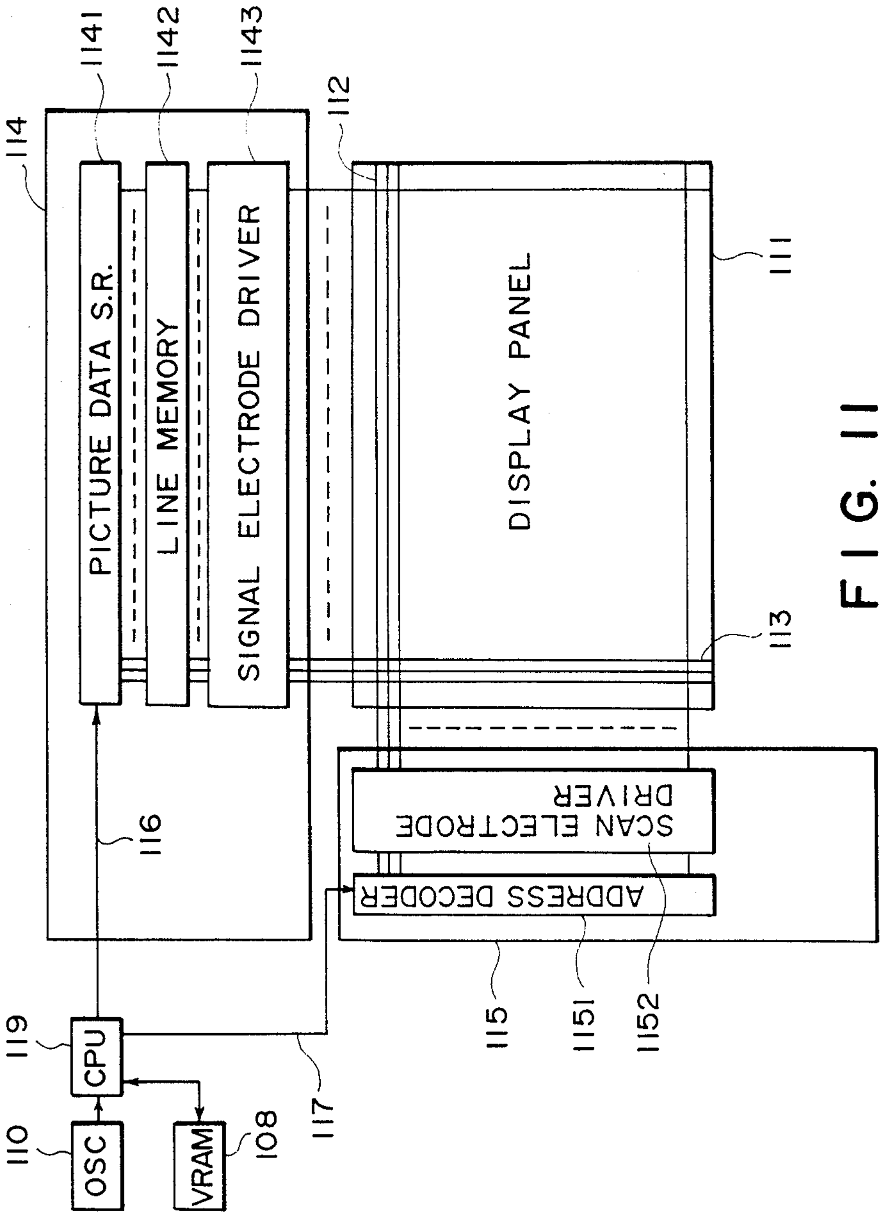
FIG. 11 is a block diagram of a ferroelectric liquid crystal panel according to the present invention.

FIG. 11 illustrates an arrangement of a display apparatus according to the present invention. The display apparatus includes a display panel comprising scanning electrodes 112, signal electrodes 113 and a ferroelectric liquid crystal (not specifically shown) disposed between these electrodes. The orientation of the ferroelectric liquid crystal is controlled at pixel formed at each intersection of a matrix of the scanning electrodes 112 and signal electrodes 113 by a voltage applied across the electrodes.

The display apparatus further includes a signal electrode driver circuit 114 comprising a picture data shift register 1141 for storing gradational picture or image data serially applied through an information signal line 116, a line memory 1142 for storing gradational picture data supplied in parallel from the picture data shift register 1141, and a signal electrode driver 1143 for applying voltage signals to the signal electrodes 113 based on the picture data stored in the line memory 1142.

The display apparatus further includes a scanning electrode driver circuit 115 comprising an address decoder 1151 for addressing a scanning electrode among all the scanning electrodes 112 based on a signal from a scanning address data line 117, and a scanning electrode driver 1152 for applying a scanning or addressing voltage signal to the scanning electrodes 112.

The apparatus is controlled by a CPU 119 which receives clock pulses from an oscillator 110 and control a picture memory 108, the information signal line 116 and the scanning address data line 117 with respect to signal transfer.

As described above, according to the present invention, a good gradational display picture can be formed without causing crosstalk.

What is claimed is:

1. A driving method for an optical modulation device comprising first electrodes and second electrodes disposed opposite to and intersecting with the first electrodes, and an optical modulation material providing a first and a second orientation state depending on an electric field applied thereto disposed between the first electrodes and the second electrodes, a pixel being formed at each intersection of the first electrodes and the second electrodes so as to form a matrix of pixels as a whole; said driving method comprising:

applying an alternating address voltage signal comprising a fore pulse and a rear pulse to an addressed electrode among the first electrodes; and applying, to the second electrodes, a first voltage signal for orienting the pixels on the addressed electrode to the first orientation state in phase with the fore pulse, and a second voltage signal for providing a pixel among the pixels on the addressed electrode with a prescribed areal ratio between the first and second orientation states in the pixel depending on given gradation data; the first and second voltage signals being set to have substantially the same absolute value.

2. A method according to claim 1, wherein said address signal comprises the fore pulse of a voltage of one polarity with respect to a reference voltage as defined as a voltage applied to a non-addressed first electrode, the rear pulse of a voltage of the other polarity, a voltage of the same voltage as the reference voltage preceding the fore pulse, and a voltage of the same voltage as the reference voltage succeeding the rear pulse.

3. A method according to claim 1, wherein the address voltage signal is sequentially applied to the first electrodes.

4. A method according to claim 1, wherein said optical modulation material is a ferroelectric liquid crystal.

5. A method according to claim 4, wherein said ferroelectric liquid crystal is a chiral smectic liquid crystal.

6. A method according to claim 5, wherein said chiral smectic liquid crystal is disposed in a layer thin enough to release its own helical structure in the absence of an electric field.

7. An optical modulation apparatus, comprising:

an optical modulation device comprising first electrodes and second electrodes disposed opposite to and intersecting with first electrodes, and an optical modulation material providing a first and a second orientation state depending on an electric field applied thereto disposed between the first electrodes and the second electrodes, a pixel being formed at each intersection of the first electrodes and the second electrodes so as to form a matrix of pixels as a whole;

means for applying an alternating address voltage signal comprising a fore pulse and a rear pulse to an addressed electrode among the first electrodes; and means for applying, to the second electrodes, a first voltage signal for orienting the pixels on the addressed electrode to the first orientation state in phase with the fore pulse, and a second voltage signal for providing a pixel among the pixels on the addressed electrode with a prescribed areal ratio between the first and second orientation states in the pixel depending on given gradation data; the first and second voltage signals being set to have substantially the same absolute value.

8. An apparatus according to claim 7, wherein said address signal comprises the fore pulse of a voltage of one polarity with respect to a reference voltage as defined as a voltage applied to a non-addressed first electrode, the rear pulse of a voltage of the other polarity, a voltage of the same voltage as the reference voltage preceding the fore pulse, and a voltage of the same voltage as the reference voltage succeeding the rear pulse.

9. An apparatus according to claim 7, wherein the address voltage signal is sequentially applied to the first electrodes.

10. An apparatus according to claim 7, wherein said optical modulation material is a ferroelectric liquid crystal.

11. An apparatus according to claim 10, wherein said ferroelectric liquid crystal is a chiral smectic liquid crystal.

12. An apparatus according to claim 11, wherein said chiral smectic liquid crystal is disposed in a layer thin enough to release its own helical structure in the absence of an electric field.

* * * * *